(12) United States Patent
Lespinasse et al.

(10) Patent No.: US 11,667,810 B2
(45) Date of Patent: *Jun. 6, 2023

(54) POLYESTER POLYMER HAVING PHENOLIC FUNCTIONALITY AND COATING COMPOSITIONS FORMED THEREFROM

(71) Applicant: The Sherwin-Williams Company, Cleveland, OH (US)

(72) Inventors: Robert Lespinasse, Boyer (FR); Benoit Prouvost, L'Abergement de Cuisery (FR); Paul Stenson, Avon, CT (US)

(73) Assignee: SWIMC LLC, Cleveland, OH (US)

( * ) Notice: Subject to any disclaimer, the term of this patent is extended or adjusted under 35 U.S.C. 154(b) by 393 days.

This patent is subject to a terminal disclaimer.

(21) Appl. No.: 16/881,410

(22) Filed: May 22, 2020

(65) Prior Publication Data

US 2020/0283656 A1 Sep. 10, 2020

Related U.S. Application Data

(60) Continuation of application No. 15/948,191, filed on Apr. 9, 2018, now Pat. No. 10,689,539, which is a continuation of application No. 14/747,081, filed on Jun. 23, 2015, now Pat. No. 9,938,430, which is a division of application No. 13/133,257, filed as application No. PCT/US2009/067347 on Dec. 9, 2009, now Pat. No. 9,096,772.

(60) Provisional application No. 61/121,454, filed on Dec. 10, 2008.

(51) Int. Cl.
| | |
|---|---|
| C09D 167/00 | (2006.01) |
| B65D 1/12 | (2006.01) |
| B65D 25/14 | (2006.01) |
| C08L 61/06 | (2006.01) |

(52) U.S. Cl.
CPC ............ *C09D 167/00* (2013.01); *B65D 1/12* (2013.01); *B65D 25/14* (2013.01); *C08L 61/06* (2013.01); *Y10T 428/1355* (2015.01)

(58) Field of Classification Search
None
See application file for complete search history.

(56) References Cited

U.S. PATENT DOCUMENTS

| | | |
|---|---|---|
| 3,647,757 A | 3/1972 | Lee |
| 4,298,658 A | 11/1981 | Thankachan et al. |
| 4,343,839 A | 8/1982 | Blegen |
| 4,365,039 A | 12/1982 | Blegen |
| 5,239,018 A | 8/1993 | Yezrielev et al. |
| 5,256,756 A | 10/1993 | Kuo |
| 5,359,025 A | 10/1994 | Kuo |
| 5,393,840 A | 2/1995 | Kuo |
| 5,416,187 A | 6/1995 | Kuo et al. |
| 5,491,031 A | 2/1996 | Seibel |
| 5,631,330 A | 5/1997 | Yezrielev et al. |
| 6,472,480 B1 | 10/2002 | Anderson |
| 2003/0069334 A1 | 4/2003 | Legleiter et al. |
| 2005/0014012 A1 | 1/2005 | Stapperfenne et al. |
| 2005/0192423 A1 | 9/2005 | Niesten et al. |
| 2007/0036903 A1 | 2/2007 | Mayr et al. |
| 2007/0054140 A1 | 3/2007 | Mayr et al. |
| 2007/0281179 A1 | 12/2007 | Ambrose et al. |
| 2013/0321041 A1 | 12/2013 | Kim et al. |
| 2013/0322012 A1 | 12/2013 | Dunwoody et al. |
| 2017/0220083 A1 | 8/2017 | Heiberg et al. |

FOREIGN PATENT DOCUMENTS

| | | |
|---|---|---|
| GB | 1554174 A | 10/1979 |
| JP | 2002088231 A | 3/2002 |
| JP | 2005126635 A | 5/2005 |

OTHER PUBLICATIONS

Madhusudhan et al. Progress in Organic Coatings, 20, 63-71, Mar. 16, 1992.
The International Preliminary Report on Patentability dated Jun. 14, 2011 for International Application No. PCT/US2009/067347 filed Dec. 12, 2009 (8 pages).
Madhusudham et al. Progess in Organic Coatings, 20, (1192) 63-71.

*Primary Examiner* — Robert T Butcher
(74) *Attorney, Agent, or Firm* — Honigman LLP

(57) ABSTRACT

A polyester polymer is provided that includes at least one pendant phenolic-containing group. In one embodiment, the polyester polymer is combined with an optional crosslinker and an optional carrier to form a coating composition suitable for use in coating articles such as packaging articles. The coating composition typically includes a resole phenolic crosslinker. In one embodiment, the polyester polymer has at least one phenolic-containing group that comprises an adduct of cardanol.

19 Claims, No Drawings

POLYESTER POLYMER HAVING PHENOLIC FUNCTIONALITY AND COATING COMPOSITIONS FORMED THEREFROM

CROSS-REFERENCE TO RELATED APPLICATION(S)

This application is a continuation of U.S. application Ser. No. 15/948,191, filed Apr. 9, 2019, which is a continuation of U.S. patent application Ser. No. 14/747,081, filed Jun. 23, 2015, which is a divisional of U.S. patent application Ser. No. 13/133,257, filed on Aug. 2, 2011, now U.S. Pat. No. 9,096,772, issued Aug. 4, 2015, which is the National Stage filing under 35 U.S.C. 371 of International Application No. PCT/US2009/067347 filed on Dec. 9, 2009, which claims the benefit of U.S. Provisional Application No. 61/121,454 filed on Dec. 10, 2008, each entitled "Polyester Polymer Having Phenolic Functionality and Coating Compositions Formed Therefrom," each of which is incorporated herein by reference in its entirety.

TECHNICAL FIELD

This invention relates to a polyester polymer, and coating compositions including the polymer.

BACKGROUND

The application of coatings to metals to retard or inhibit corrosion is well established. This is particularly true in the area of metal food and beverage cans. Coatings are typically applied to the interior of such containers to prevent the contents from contacting the metal of the container. Contact between the metal and the packaged product can lead to corrosion of the metal container, which can contaminate the packaged product. This is particularly true when the contents of the container are chemically aggressive in nature. Protective coatings are also applied to the interior of food and beverage containers to prevent corrosion in the headspace of the container between the fill line of the food product and the container lid, which is particularly problematic with high-salt-content food products.

Packaging coatings should preferably be capable of high-speed application to the substrate and provide the necessary properties when hardened to perform in this demanding end use. For example, the coating should be safe for food-contact; not adversely affect the taste of the packaged food or beverage product; have excellent adhesion to the substrate; resist staining and other coating defects such as "popping," "blushing" and/or "blistering;" and resist degradation over long periods of time, even when exposed to harsh environments. In addition, the coating should generally be capable of maintaining suitable film integrity during container fabrication and be capable of withstanding the processing conditions that the container may be subjected to during product packaging.

Various coatings have been used as interior protective can coatings, including epoxy-based coatings and polyvinyl-chloride-based coatings. Each of these coating types, however, has potential shortcomings. For example, the recycling of materials containing polyvinyl chloride or related halide-containing vinyl polymers can be problematic. There is also a desire to reduce or eliminate certain epoxy compounds commonly used to formulate food-contact epoxy coatings.

To address the aforementioned shortcomings, the packaging coatings industry has sought coatings based on alternative binder systems such as polyester resin systems. It has been problematic, however, to formulate polyester-based coatings that exhibit the required balance of coating characteristics (e.g., flexibility, adhesion, corrosion resistance, stability, resistance to crazing, etc.). For example, there has been a tradeoff between corrosion resistance and fabrication properties for such coatings. Polyester-based coatings suitable for food contact that have exhibited both good fabrication properties and an absence of crazing having tended to be too soft and exhibit unsuitable corrosion resistance. Conversely, polyester-based coatings suitable for food contact that have exhibited good corrosion resistance have typically exhibited poor flexibility and unsuitable crazing when fabricated.

What is needed in the marketplace is an improved binder system for use in coatings such as packaging coatings.

SUMMARY

In one aspect, the present invention provides a binder system comprising a polyester polymer having phenolic functionality. The polyester polymer typically includes at least one, and more preferably a plurality, of phenolic-containing pendant and/or terminal groups. The polyester polymer preferably includes at least one phenolic-containing pendant (or side) group. In one embodiment, at least one of the phenolic-containing groups is a derivative of cardanol. In another embodiment, at least one of the phenolic-containing groups is provided by diphenolic acid, more preferably at least one of the phenolic-containing groups is a diphenolic-acid-based pendant group.

In another aspect, the invention provides a coating composition useful for coating a wide variety of articles, including food or beverage containers. Certain preferred coating compositions of the invention are particularly useful as food-contact coatings for use on surfaces of metal food or beverage containers. The coating composition typically includes a phenolic-functional polyester, an optional crosslinker, and an optional carrier. In a presently preferred embodiment, the optional crosslinker includes at least one resole phenolic crosslinker.

In yet another aspect, the invention provides an article coated on at least one surface with a coating composition described herein. In certain embodiments, the coated article comprises a food or beverage can, or a portion thereof, having a body portion and/or end portion coated with a coating composition of the invention.

In yet another aspect, the invention provides a method for producing a coated article. The method includes providing a coating composition described herein and applying the coating composition on a substrate (typically a planar metal substrate) prior to, or after, forming the substrate into an article such as food or beverage can or a portion thereof.

The above summary of the present invention is not intended to describe each disclosed embodiment or every implementation of the present invention. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the description below. Other features, objects, and advantages of the invention will be apparent from the description and from the claims.

Selected Definitions

Unless otherwise specified, the following terms as used herein have the meanings provided below.

As used herein, the term "organic group" means a hydrocarbon group (with optional elements other than carbon and hydrogen, such as oxygen, nitrogen, sulfur, and silicon) that is classified as an aliphatic group, cyclic group, or combination of aliphatic and cyclic groups (e.g., alkaryl and aralkyl groups). The term "aliphatic group" means a saturated or unsaturated linear or branched hydrocarbon group. This term is used to encompass alkyl, alkenyl, and alkynyl groups, for example. The term "alkyl group" means a saturated linear or branched hydrocarbon group including, for example, methyl, ethyl, isopropyl, t-butyl, heptyl, dodecyl, octadecyl, amyl, 2-ethylhexyl, and the like. The term "alkenyl group" means an unsaturated, linear or branched hydrocarbon group with one or more carbon-carbon double bonds, such as a vinyl group. The term "cyclic group" means a closed ring hydrocarbon group that is classified as an alicyclic group or an aromatic group, both of which can include heteroatoms.

A group that may be the same or different is referred to as being "independently" something. Substitution is anticipated on the organic groups of the compounds of the present invention. As a means of simplifying the discussion and recitation of certain terminology used throughout this application, the terms "group" and "moiety" are used to differentiate between chemical species that allow for substitution or that may be substituted and those that do not allow or may not be so substituted. Thus, when the term "group" is used to describe a chemical substituent, the described chemical material includes the unsubstituted group and that group with O, N, Si, or S atoms, for example, in the chain (as in an alkoxy group) as well as carbonyl groups or other conventional substitution. Where the term "moiety" is used to describe a chemical compound or substituent, only an unsubstituted chemical material is intended to be included. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc. On the other hand, the phrase "alkyl moiety" is limited to the inclusion of only pure open chain saturated hydrocarbon alkyl substituents, such as methyl, ethyl, propyl, t-butyl, and the like.

When a group is defined to be "null" or a "null group" what is meant is that the group is absent. By way of example, when a group such as, e.g., a linking group is defined to have a structure represented by the formula —$(CR^aR^b)_n$—, at least two of the R groups (e.g., at least one R group from each of a pair of adjacent carbon atoms) will typically be a null group if the linking group includes a carbon-carbon double or triple bond.

The term "substantially free" of a particular mobile compound means that the compositions of the invention contain less than 100 parts per million (ppm) of the recited mobile compound. The term "essentially free" of a particular mobile compound means that the compositions of the invention contain less than 10 ppm of the recited mobile compound. The term "essentially completely free" of a particular mobile compound means that the compositions of the invention contain less than 1 ppm of the recited mobile compound. The term "completely free" of a particular mobile compound means that the compositions of the invention contain less than 20 parts per billion (ppb) of the recited mobile compound.

If the aforementioned phrases are used without the term "mobile" (e.g., "substantially free of XYZ compound") then the compositions of the present invention contain less than the aforementioned amount of the compound whether the compound is mobile in the coating or bound to a constituent of the coating.

The term "mobile" means that the compound can be extracted from the cured coating when a coating (typically ~1 milligram per square centimeter ($mg/cm^2$) (6.5 $mg/in^2$) thick) is exposed to a test medium for some defined set of conditions, depending on the end use. An example of these testing conditions is exposure of the cured coating to HPLC-grade acetonitrile for 24 hours at 25° C.

The term "food-contact surface" refers to a surface of an article (e.g., a food or beverage container) that is in contact with, or suitable for contact with, a food or beverage product. When used in the context of a coating composition applied on a food-contact surface of a packaging article (e.g., a food or beverage container), the term refers to the underlying substrate (typically associated with an interior surface of the packaging article) on which the coating composition is applied and does not imply that the underlying portion of the substrate will be in contact with a food or beverage product.

The term "crosslinker" refers to a molecule capable of forming a covalent linkage between polymers or between two different regions of the same polymer.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers).

The term "unsaturation" when used in the context of a compound refers to a compound that includes at least one non-aromatic carbon-carbon double or triple bond.

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

DETAILED DESCRIPTION

In one aspect, the invention provides a polyester polymer having phenolic functionality. The polyester polymer preferably includes at least one, and more preferably a plurality, of phenolic-containing pendant and/or terminal groups. Preferably, the polyester polymer includes one or more phenolic-containing pendant groups. As used herein, the phrase "phenolic-containing group" refers to a group, typically a pendant or terminal group, which (i) includes one or more phenolic groups and (ii) may include one or more other groups. In preferred embodiments, the polyester polymer includes one or more phenolic groups capable of entering into a crosslinking reaction with a crosslinker such as, for example, a resole-type phenolic crosslinker.

In another aspect, the invention is a coating composition that includes the phenolic-functional polyester. While non-food-contact coating compositions are within the scope of this invention, preferred coating compositions are packaging coating compositions suitable for use as food-contact coatings. The coating composition of the invention preferably includes a phenolic-functional polyester polymer, an optional crosslinker (preferably a resole-type phenolic crosslinker), and an optional liquid carrier. The coating composition preferably also includes a catalyst (such as, e.g., an acid catalyst) to enhance curing and/or crosslinking. Although liquid-carrier-based coating compositions are preferred, it is contemplated that the phenolic-functional polyester polymer of the invention may have utility in other coating application techniques such as, for example, powder coating, extrusion coating, or lamination.

Conventional food-contact, polyester-based packaging coatings have typically been based on a mixture of a high-molecular weight polyester polymer and crosslinking resin. Such polyesters have typically included relatively few reactive hydroxyl groups and, moreover, the reactive groups of the crosslinking resins have not typically exhibited a high propensity to enter into crosslinking reactions with the hydroxyl groups of the polyester. Upon curing, relatively few crosslinks are believed to be formed between the polyester and the crosslinking resin, resulting in a network of self-crosslinked crosslinker resin having unreacted polyester polymer dispersed therein. Such conventional polyester coatings have suffered from a variety of performance issues such as poor chemical resistance, a lack of flexibility, and/or unsuitable crazing. As used herein, the term "crazing" refers to specific coating defects that occur upon fabrication of a coated metal substrate. While not intending to be bound by any theory, these coating defects are believed to be attributable to an increase in the crystallinity of coating materials that occurs between curing of the coating and fabrication of the coated article. Unlike conventional food-contact polyester coatings, preferred cured coatings of the invention exhibit a suitable balance of coating properties, including excellent corrosion resistance, excellent fabrication properties, and an absence of crazing.

While not intending to be bound by any theory, the superb balance of coating properties exhibited by preferred coating compositions of the invention is believed to be attributable, at least in part, to one or more of: (i) the reactivity of the phenolic group(s) of the polyester, (ii) the locating of crosslinking sites throughout the polyester polymer (as opposed to merely at terminal ends as is typical for conventional polyesters) through incorporation of phenolic-containing pendant groups, (iii) an increased number of crosslinking sites in the polyester polymer, and/or (iv) the particular selection of crosslinker(s).

Suitable polyester polymers may be prepared using standard condensation reactions. The polyester polymer is typically derived from a mixture of at least one polyfunctional alcohol ("polyol") esterified with at least one polycarboxylic acid (or derivative thereof).

Examples of suitable polycarboxylic acids include dicarboxylic acids and polycarboxylic acids having higher acid functionality (e.g., tricarboxylic acids, tetracarboxylic acids, etc.), precursors or derivatives thereof (e.g., an esterifiable derivative of a polycarboxylic acid, such as a dimethyl ester or anhydride), or mixtures thereof. Suitable polycarboxylic acids may include, for example, maleic acid, fumaric acid, succinic acid, adipic acid, phthalic acid, tetrahydrophthalic acid, methyltetrahydrophthalic acid, hexahydrophthalic acid, methylhexahydrophthalic acid, endomethylenetetrahydrophthalic acid, azelaic acid, sebacic acid, tetrahydrophthalic acid, isophthalic acid, trimellitic acid, terephthalic acid, a naphthalene dicarboxylic acid, cyclohexane-dicarboxylic acid, glutaric acid, dimer fatty acids, anhydrides or derivatives thereof, and mixtures thereof. If desired, adducts of polyacid compounds (e.g., triacids, tetraacids, etc.) and monofunctional compounds may be used. An example of one such adduct is pyromellitic anhydride pre-reacted with benzyl alcohol. It should be understood that in synthesizing the polyester, the specified acids may be in the form of anhydrides, esters (e.g., alkyl ester) or like equivalent form. For sake of brevity, such compounds are referred to herein as "carboxylic acids."

Examples of suitable polyols include diols, polyols having three or more hydroxyl groups (e.g., triols, tetraols, etc.), and combinations thereof. Suitable polyols may include, for example, ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexanedimethanol, a polyethylene or polypropylene glycol, isopropylidene bis (p-phenylene-oxypropanol-2), and mixtures thereof. If desired, adducts of polyol compounds (e.g., triols, tetraols, etc.) and monofunctional compounds may be used. An example of one such adduct is dipentaerythritol pre-reacted with benzoic acid.

As discussed above, the polyester polymer of the invention preferably includes phenolic functionality. In presently preferred embodiments, the polyester polymer includes one or more (e.g., ≥2, ≥3, ≥4, ≥5, ≥10, etc.) phenolic-containing pendant groups. The phenolic-containing pendant group preferably includes at least one phenolic group in which (i) one or more of the ortho or para positions of the aromatic ring is free or not deactivated, e.g., for purposes of an electrophilic attack or, more preferably, (ii) where one or more of the ortho or para positions of the aromatic ring have been activated.

In preferred embodiments, the polyester polymer has at least one, more preferably two or more, phenolic-containing pendant groups of formula (I):

-[BACKBONE SEGMENT]-, $^L X—(CR^1R^2)_n—Z$ where:
-[BACKBONE SEGMENT]- depicts a segment of the backbone of the polyester polymer;
X, if present, depicts an organic linking group (e.g., a divalent organic linking group) connected to the backbone;
Z depicts a phenolic group;
$R^1$ and $R^2$ are preferably independently selected from a hydrogen atom, a substituted or unsubstituted alkyl group, a substituted or unsubstituted cycloalkyl group, a substituted or unsubstituted aryl group (including, e.g., a phenolic group), a substituted or unsubstituted alkenyl group, or a null group (e.g., if one or more carbon-carbon double and/or triple bonds is present in the —(CR$^1$R$^2$)$_n$— group); and n is 0 or more, preferably ≥1, more preferably from about 1 to about 30 and, in some embodiments, 1 or 2.

The (CR$^1$R$^2$)$_n$ group of Formula (I) is preferably attached to the aromatic ring of the Z phenolic group at a meta or para position, which is illustrated in the below simplified structure (II):

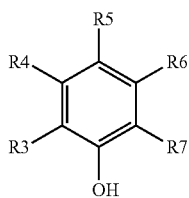

where:
one of R$^4$, R$^5$, or R$^6$ includes the aforementioned (CR$^1$R$^2$)$_n$ group of Formula (I) and links the phenolic group to the polyester backbone, wherein, if desired, two of R$^4$, R$^5$, or R$^6$ can join to form a ring optionally containing one or more heteroatoms; and each of the remaining R groups (i.e., the four remaining R$^3$-R$^7$ groups that do not include the aforementioned (CR$^1$R$^2$)$_n$ group of structure (II) preferably denotes one of a hydrogen atom, a hydroxyl group, or an organic group (e.g., a substituted or unsubstituted alkyl or cycloalkyl group, a substituted or unsubstituted aryl group, or a substituted or unsubstituted alkenyl group).

As depicted in structure (II), R$^3$ and R$^7$ are located at the ortho positions of the phenolic ring. The R$^3$ and R$^7$ groups are preferably selected such that the ortho positions of the phenolic ring remain sufficiently reactive to, for example, react with a crosslinker such as a resole phenolic crosslinker. Similarly, R$^4$, R$^5$, and R$^6$ are preferably selected such that the ortho positions of the phenolic ring remain substantially reactive. In presently preferred embodiments, each of R$^3$ and R$^7$ is preferably independently one of a hydrogen atom, a methylol group, or an etherified methylol group. In one embodiment, both of R$^3$ and R$^7$ are hydrogen.

X, if present, may be any suitable linking group. In some embodiments, the X group may include one or more condensation linkage groups such as an amide, urethane, ether, urea, or carbonate ester (—O—C(=O)—O—) linkage group. The condensation linkage may be attached directly to the aforementioned (CR$^1$R$^2$)$_n$ group of Formula (I) or, alternatively, may be attached to another group of X that is attached to the (CR$^1$R$^2$)$_n$ group. Similarly, the condensation linkage may be attached directly to the backbone of the polyester polymer or may be attached to another group of X that is attached to the polymer backbone. In certain preferred embodiments, the X group includes an ester linkage group. In some embodiments, X is an ester group.

X may include one or more substituted or unsubstituted hydrocarbyl linkage groups. In some embodiments, a C1-C30 substituted or unsubstituted hydrocarbyl linkage group is attached on one end to the polyester backbone and on another end to the phenolic group. In some embodiments, X may have a structure depicted by the schematic formula —C(R$^8$R$^9$)—, where R$^8$ and R$^9$ preferably independently denote a hydrogen atom, a substituted or unsubstituted alkyl group, a substituted or unsubstituted cycloalkyl group, a substituted or unsubstituted aryl group, a substituted or unsubstituted alkenyl groups, or a null group.

In some embodiments, one of R$^8$ or R$^9$ is hydrogen and one of R$^8$ or R$^9$ is an alkyl or alkenyl group. For example, certain phenolic-functional polyesters made from reactants including maleinized cardanol adducts (see, for example, the maleinized cardanol adduct depicted structurally herein) may have such an X group.

The phenolic-functional polyester polymer of the invention may include any suitable number of phenolic-containing pendant and/or terminal groups. As discussed above, one useful measure of such groups is the number of such groups present on the polymer. Another useful measure is the weight percent of the phenolic-containing pendant groups relative to the total weight of the phenolic-functional polyester polymer. In preferred embodiments, the phenolic-containing groups (more preferably pendant phenolic-containing groups) constitute between about 1 and 60 weight percent ("wt-%") of the polyester polymer. More preferably, phenolic-containing pendant groups constitute greater than about 5 wt-%, even more preferably greater than about 10 wt-%, and even more preferably greater than about 15 wt-% of the phenolic-functional polyester polymer. More preferably, phenolic-containing pendant groups constitute less than about 40 wt-%, even more preferably less than about 35 wt-%, and even more preferably less than about 30 wt-% of the phenolic-functional polyester polymer. The above wt-% for the phenolic-containing pendant group(s) is determined in the context of the weight of the monomers that include the phenolic-containing pendant group(s) relative to the total weight of the polymer. Thus, for example, if an oligomer having a phenolic-containing pendant group is incorporated into the backbone of the polyester polymer, the wt-% of phenolic-containing pendant group in the polymer is calculated using the weight of the monomer that includes the phenolic-containing pendant group (as opposed to the weight of the oligomer that includes the monomer). In some embodiments, the aforementioned phenolic-containing pendant group amounts correspond to an amount of diphenolic acid incorporated into the polymer.

Phenolic functionality may be incorporated into the polyester polymer of the invention using any suitable means. For example, the phenolic functionality may be provided by either of the following non-limiting approaches: (A) modifying a preformed polyester polymer to include a phenolic-containing group (preferably a phenolic-containing pendant group) or (B) forming a polyester polymer from a mixture of reactants including one or more reactants having a phenolic group.

A non-limiting example of method (A) above includes the steps of:
1. providing a polyester polymer having reactive functional groups (preferably one or more of which is a pendant reactive functional group) capable of participating in a condensation reaction such as, for example, carboxylic, hydroxyl, amine, carbonate ester, isocyanate groups, or mixtures thereof;
2. providing a phenolic-containing compound have a functional group capable of reacting with the aforementioned functional group of the polyester polymer to form a condensation linkage such as, for example, an ester, amide, urethane, urea, or carbonate ester linkage; and
3. reacting the polyester polymer and the phenolic-containing compound to form a polyester having phenolic functionality, and more preferably, pendant phenolic functionality.

For the above step 2, it is contemplated that the reactive group of the phenolic-containing compound capable of reacting with the functional group of the polyester polymer can be introduced into the phenolic-containing compound using a Diels-Alder reaction or Diels-ene reaction. For example, a phenol-containing compound having an unsaturated substituted or unsubstituted hydrocarbyl group (e.g., an alkenyl group) as a substituent of the phenol group can be reacted with an unsaturated compound having the functional group capable of reacting with the functional group of the polyester polymer.

After the phenolic-functional polyester has been formed, it may be used as is or it may be further reacted with formaldehyde (preferably in the presence of butanol or a like compound) to graft methylols or etherified methylols onto the phenolic ring.

The phenolic-containing groups may be derived from any suitable compound or compounds. Examples of suitable compounds include:

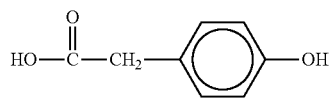

p-hydroxyphenyl acetic acid ("pHPAA");

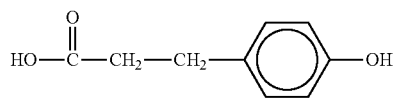

p-hydroxypropinoic acid ("pHPPA");

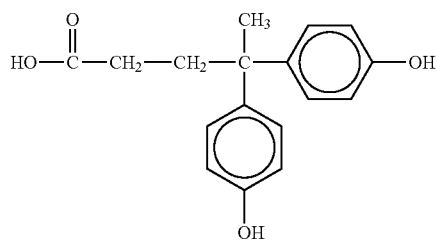

diphenolic acid;

alkyl esters thereof; cardanol; and mixtures or derivatives thereof. In a presently preferred embodiment, the phenolic-group is derived from diphenolic acid.

Although not preferred, p-hydroxybenzoic acid may be used if desired. The generalized structure for p-hydroxybenzoic acid is provided below.

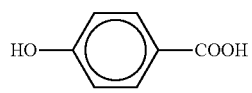

While not intending to be bound by any theory, direct linkage of a carbonyl carbon (e.g., such as present in p-hydroxybenzoic acid) to a carbon of the phenolic ring is believed to unsuitably deactivate the phenolic ring. To avoid such deactivation, phenolic-containing compounds are preferably used that include at least one carbon atom (e.g., in the form of a methylene carbon atom) between the phenolic ring and the carbon atom of a carbonyl group or other reactive functional group.

By way of example, a phenolic-functional polyester of the invention may be formed by reacting pHPAA, pHPPA, diphenolic acid, and/or alkyl esters thereof with a trifunctional or higher polyol such as trimethylol propane ("TMP") prior to, or after, incorporating the trifunctional or higher polyol into the backbone of a polyester polymer via a condensation reaction.

Similarly, by way of example, a phenolic-functional polyester of the invention may also be formed by reacting (i) a phenolic-containing compound having a hydroxyl group or other group reactive with an acid, anhydride, or ester group (e.g., hydroxyl phenyl ethanol) with (ii) an acid, anhydride, or ester-functional branching compound (e.g., trimellitic anhydride) preferably having at least three groups reactive with a hydroxyl group (with an anhydride group being counted as two groups) prior to, or after, incorporating the branching compound into the backbone of a polyester polymer via a condensation linkage.

In some embodiments, the phenolic-functional polyester polymer of the invention is derived from a phenol compound having an unsaturated hydrocarbyl chain (which may be substituted) such as an alkenyl- or alkynyl-substituted phenol containing one or more carbon-carbon double or triple bonds. To facilitate incorporation into a polyester, a compound having one or more reactive groups (e.g., hydroxyl, carboxylic, amine, isocyanate, etc.) may be grafted on to the unsaturated hydrocarbyl chain of the phenol-containing compound.

Cardanol is a presently preferred alkenyl-substituted phenol. Cardanol is a meta-substituted phenol derived from cashew nut shell liquid. A generalized structure of cardanol is provided below:

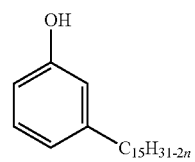

where n corresponds to the number of carbon-carbon double bonds present in the alkenyl side chain and is typically 0, 1, 2 or 3. When more than one carbon-carbon double bond is present in the meta-positioned alkenyl chain, the carbon-carbon double bonds may be conjugated or non-conjugated. Since cardanol is derived from a naturally occurring feedstock, commercial feedstocks of cardanol may contain variants of the above generalized structure (e.g., compounds having a second hydroxyl group at the "open" meta position) and minor amounts of other compounds. It is contemplated that compounds having the above generalized structure may be reacted on the alkenyl chain without affecting significantly the beneficial reactive properties of the phenolic ring. In addition, it is also contemplated that the phenolic ring itself may be further substituted, if desired.

The unsaturation present on the side chain of cardanol may be utilized for purposes of grafting cardanol onto a preformed unsaturated polyester or onto another ingredient useful for forming the polyester polymer. By way of example, cardanol may be grafted onto an unsaturated reactant such as an unsaturated polyol, an unsaturated polycarboxylic acid or anhydride, or any other unsaturated compound having suitable reactivity to form a grafted cardanol adduct capable of being polymerized (e.g., via a condensation reaction such as esterification) into the backbone of the polyester polymer. Any suitable grafting mechanism may be used to produce the grafted adduct or graft polymer, including mechanisms such as Diels-Alder or Diels-ene addition reactions.

A presently preferred cardanol adduct is a reaction product of cardanol and an unsaturated anhydride. Suitable unsaturated anhydrides may include unsaturated dicarboxylic acid anhydrides such as maleic anhydride, itaconic anhydride, nonenylsuccinic anhydride, citraconic anhydride, and mixtures thereof. The production of a cardanol adduct from (a) a cardanol compound having a single carbon-carbon double bond in the alkenyl chain and, thus, an "n" of 1 and (b) maleic anhydride is illustrated below:

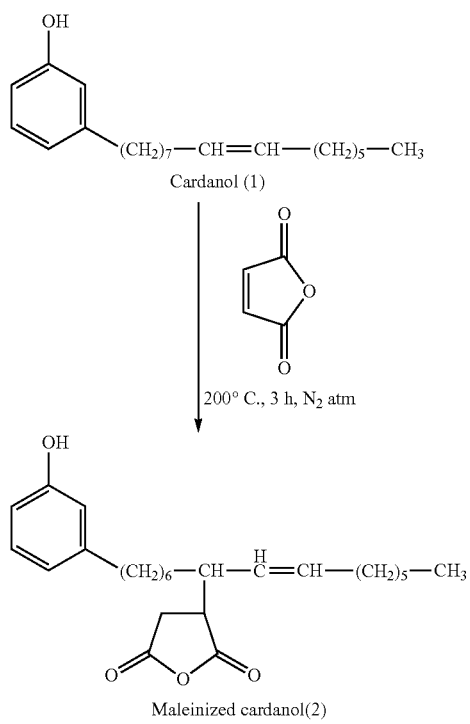

In embodiments where the polyester polymer includes cardanol, the polyester polymer may include any suitable amount of cardanol to achieve the desired result. In certain embodiments, the polyester polymer includes from about 5 to about 75% by weight of cardanol, more preferably from about 10 to about 60% by weight of cardanol, and even more preferably from about 25 to about 45% by weight of cardanol.

It is further contemplated that other substituted phenolics containing side-chain unsaturation may be employed in place of, or in addition to, cardanol. Such compounds preferably include at least one phenolic group having a structure pursuant to the aforementioned structure (II). The phenolic group may be substituted with any suitable unsaturated group that includes at least one carbon-carbon double or triple bond and at least two carbon atoms. For example, the unsaturated group may be a C2-C30 substituted or unsubstituted alkenyl or cycloalkenyl group having one or more carbon-carbon double or triple bonds (e.g., 2, 3, 4, or more). When two or more carbon-carbon double or triple bonds are present, the bonds may be conjugated or non-conjugated.

In some embodiments, the backbone of the polyester polymer is hydroxy-terminated or carboxy-terminated, more preferably hydroxy-terminated.

The polyester polymer may have any suitable hydroxyl number. Hydroxyl numbers are typically expressed as milligrams of potassium hydroxide (KOH) equivalent to the hydroxyl content of 1 gram of the hydroxyl-containing substance. Methods for determining hydroxyl numbers are well known in the art. See, for example, ASTM D 1957-86 (Reapproved 2001) entitled "Standard Test Method for Hydroxyl Value of Fatty Oils and Acids" and available from the American Society for Testing and Materials International of West Conshohocken, Pa. In certain preferred embodiments, the polyester polymer has a hydroxyl number of from 0 to about 150, more preferably from about 10 to about 150, even more preferably from about 25 to about 100, and optimally from about 30 to about 80.

The polyester polymer may have any suitable acid number. Acid numbers are typically expressed as milligrams of KOH required to titrate a 1 gram sample to a specified end point. Methods for determining acid numbers are well known in the art. See, for example, ASTM D 974-04 entitled "Standard Test Method for Acid and Base Number by Color-Indicator Titration" and available from the American Society for Testing and Materials International of West Conshohocken, Pa. In certain preferred embodiments, the polyester polymer has an acid number of less than about 20, more preferably less than about 10, and even more preferably less than about 5.

The molecular weight of the phenolic-functional polyester polymer of the invention can vary depending upon material choice and the desired end use. In preferred embodiments, the polyester polymer has a number average molecular weight (Mn) of at least about 1,000, more preferably at least about 1,500, and even more preferably at least about 3,000. Preferably, the Mn of the polyester polymer is less than about 20,000, more preferably less than about 15,000, and even more preferably less than about 10,000.

The phenolic-functional polyester polymer of the invention can have any suitable glass transition temperature (Tg). Preferably, the phenolic-functional polyester exhibits a Tg of at least 0° C., more preferably at least 5° C., and even more preferably at least 10° C. In some embodiments, it may be desirable for the phenolic-functional polyester to have a Tg of less than 100° C., more preferably less than 80° C., and even more preferably less than 60° C.

In some embodiments, the phenolic-functional polyester preferably has a Tg greater than 60° C. For example, in some embodiments (intended for certain end uses) where diphenolic acid is used to incorporate pendant phenolic functionality into the polyester, the phenolic-functional polyester preferably has a Tg greater than 60° C.

Coating compositions of the invention may include any suitable amount of phenolic-functional polyester polymer to produce the desired result. In preferred embodiments, the coating compositions include at least about 10, more preferably at least about 15, and even more preferably at least about 20 wt-% of phenolic-functional polyester polymer, based on the total nonvolatile weight of the coating composition. Preferably, the coating compositions include less than about 90, more preferably less than about 85, and even more preferably less than about 80 wt-% of phenolic-functional polyester polymer, based on the total nonvolatile weight of the coating composition.

If water dispersibility is desired, the phenolic-functional polyester polymer may contain a suitable amount of salt-containing and/or salt-forming groups to facilitate preparation of an aqueous dispersion or solution. Suitable salt-forming groups may include neutralizable groups such as acidic or basic groups. At least a portion of the salt-forming groups may be neutralized to form salt groups useful for dispersing the polyester polymer into an aqueous carrier. Acidic or basic salt-forming groups may be introduced into the polyester polymer by any suitable method.

In some embodiments, a water-dispersible phenolic-functional polymer is achieved through inclusion of a sufficient number of carboxylic acid groups in the polymer. Examples of suitable materials for incorporating such groups into the polymer include polyanhydrides such as tetrahydrophthalic anhydride, pyromellitic anhydride, succinic anhydride, trimilletic anhydride ("TMA"), and mixtures thereof. In one embodiment, a hydroxyl-terminated polyester polymer or oligomer having one or more pendant hydroxyl groups is reacted with an anhydride such as TMA to produce a hydroxyl-terminated polyester having carboxylic functionality. The conditions of the reaction are controlled, including the temperature, to avoid gelling. The resulting carboxylic-functional polyester oligomer or polymer is neutralized (e.g., using a base such as an amine) to produce an aqueous dispersion. In some embodiments, it is contemplated that water dispersibility may be provided through use of acid-functional ethylenically unsaturated monomers that have been grafted onto the polyester to form a polyester-acrylic copolymer, whereby a suitable number of the acid-functional groups are neutralized with base (such as, e.g., a tertiary amine) to produce salt groups. See for example, U.S. Pat. App. No. 20050196629 for examples of such techniques.

Preferred polyester polymers and/or coating compositions of the inventions are preferably substantially free, more preferably essentially free, even more preferably essentially completely free, and optimally completely free of mobile bisphenol A (BPA) and aromatic glycidyl ether compounds (e.g., diglycidyl ethers of bisphenol (BADGE), diglycidyl ethers of bisphenol F (BFDGE), and epoxy novalacs). In certain preferred embodiments, the polyester polymer and/or coating composition of the inventions are preferably substantially free, more preferably essentially free, even more preferably essentially completely free, and optimally completely free of bound BPA and aromatic glycidyl ether compounds (e.g., BADGE, BFDGE and epoxy novalacs).

Preferred phenolic-functional polyesters are at least substantially "epoxy-free", more preferably "epoxy-free." The term "epoxy-free", when used herein in the context of a polymer, refers to a polymer that does not include any "epoxy backbone segments" (i.e., segments formed from reaction of an epoxy group and a group reactive with an epoxy group). Thus, for example, a polymer made from ingredients including an epoxy resin would not be considered epoxy-free. Similarly, a polymer having backbone segments that are the reaction product of a bisphenol (e.g., bisphenol A, bisphenol F, bisphenol S, 4,4'dihydroxy bisphenol, etc.) and a halohdyrin (e.g., epichlorohydrin) would not be considered epoxy-free. However, a vinyl polymer formed from vinyl monomers and/or oligomers that include an epoxy moiety (e.g., glycidyl methacrylate) would be considered epoxy-free because the vinyl polymer would be free of epoxy backbone segments. In some embodiments, the coating composition of the invention is epoxy-free, or at least substantially epoxy-free.

When present, the concentration of one or more optional crosslinkers may vary depending upon the desired result. For example, in some embodiments, the coating compositions may contain from about 0.01 wt-% to about 40 wt-%, more preferably from about 0.5 wt-% to about 35 wt-%, or even more preferably from about 3 wt-% to about 30 wt-% of one or more crosslinkers, by weight of nonvolatile material in the coating composition.

Any suitable crosslinker can be used. For example, phenolic crosslinkers (e.g., phenoplasts), amino crosslinkers (e.g., aminoplasts), blocked isocyanate crosslinkers, materials including oxirane groups (e.g., oxirane-functional polyester such as glycidol-modified polyesters or oxirane-functional vinyl polymers such as acrylic resins formed using glycidyl methacrylate) and combinations thereof, may be used. Preferred crosslinkers are at least substantially free, more preferably completely free, of bound BPA and aromatic glycidyl ethers. See, e.g., PCT application number PCT/US2009/065467 for a discussion of methods for producing glycidol-modified polyesters.

Examples of suitable phenolic crosslinkers (e.g., phenoplasts) include the reaction products of aldehydes with phenols. Formaldehyde and acetaldehyde are preferred aldehydes. Examples of suitable phenols that can be employed include phenol, cresol, p-phenylphenol, p-tert-butylphenol, p-tert-amylphenol, cyclopentylphenol, cresylic acid, BPA (not presently preferred), and combinations thereof.

Resole-type phenolic crosslinkers are presently preferred for food or beverage coating applications and, in particular, food-contact coatings. While not intending to be bound by any theory, cured packaging coatings formulated using the phenolic-functional polyester polymer of the invention and one or more resole-type phenolic crosslinkers (with or without additional crosslinkers such as, e.g., aminoplasts and/or blocked isocyanate) have been observed to exhibit superior coating properties (e.g., superior corrosion resistance) relative to comparable coating compositions formulated with other types of crosslinker(s) (e.g., amino and/or blocked isocyanate alone without resole-type phenolic crosslinkers). In preferred embodiments, the resole-type phenolic crosslinker is believed to form covalent bonds with the phenolic groups of the polyester, resulting in the formation of a crosslinked polymer network including both the phenolic crosslinker and the polyester. While not intending to be bound by any theory, this is believed to be responsible, at least in part, for the enhanced coating properties exhibited by certain preferred packaging coatings of the invention relative to conventional packaging coatings containing polyester and phenolic resins that do not form such a polymer network with each other.

Examples of suitable resole phenolic crosslinkers include the DUREZ 33160 and 33162 products (each available from Durez Corporation, Addison, Tex.), the Bakelite 6535 and 6470 products (each available from Hexion Specialty Chemicals GmbH), the PHENODUR PR 285 and PR 812 products (each available from CYTEC Surface Specialties, Smyrna, Ga.), and the SFC 112 and 142 products (each available from the SI Group, previously Schenectady) and mixtures thereof. In presently preferred embodiments, the coating composition includes, on a total solids basis, at least about 5, more preferably at least about 10, and even more preferably at least about 15% by weight of resole phenolic crosslinkers.

Amino crosslinker resins (e.g., aminoplasts) are typically the condensation products of aldehydes (e.g., such as formaldehyde, acetaldehyde, crotonaldehyde, and benzaldehyde) with amino- or amido-group-containing substances (e.g., urea, melamine and benzoguanamine). Suitable amino crosslinking resins include, for example, benzoguanamine-formaldehyde-based resins, melamine-formaldehyde-based resins (e.g., hexamethonymethyl melamine), etherified melamine-formaldehyde, urea-formaldehyde-based resins, and mixtures thereof.

Condensation products of other amines and amides can also be employed such as, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is typically formaldehyde, other similar condensation products can be made from other aldehydes, such as acetaldehyde, crotonaldehyde, acrolein, benzaldehyde, furfural, glyoxal and the like, and mixtures thereof.

Suitable commercially available amino crosslinking resins include, for example, CYMEL 301, CYMEL 303, CYMEL 370, CYMEL 373, CYMEL 1131, CYMEL 1125, and CYMEL 5010 Maprenal MF 980 (all available from Cytec Industries Inc., West Patterson, N.J.) and Uramex BF 892 (available from DSM, Netherlands).

One preferred optional ingredient is a catalyst to increase the rate of cure and/or the extent of crosslinking. The catalyst is typically chosen from among the catalysts known for use in the crosslinking of resole type phenolic resin and/or the electrophilic substitution of aromatic rings. Examples of such catalysts, include but are not limited to, strong acids (e.g., dodecylbenzene sulphonic acid (DDBSA), available as CYCAT 600 from Cytec), methane sulfonic acid (MSA), p-toluene sulfonic acid (pTSA), dinonylnaphthalene disulfonic acid (DNNDSA), and triflic acid, phosphoric acid, and mixtures thereof.

If used, a catalyst is preferably present in an amount of at least 0.01 wt-%, and more preferably at least 0.1 wt-%, based on the weight of nonvolatile material. If used, a catalyst is preferably present in an amount of no greater than 3 wt-%, and more preferably no greater than 1 wt-%, based on the weight of nonvolatile material.

If desired, coating compositions of the invention may optionally include other additives that do not adversely affect the coating composition or a cured coating resulting therefrom. The optional additives are preferably at least substantially free of mobile and/or bound BPA and aromatic glycidyl ether compounds (e.g., BADGE, BFDGE and epoxy novalac compounds) and are more preferably completely free of such compounds. Suitable additives include, for example, those that improve the processability or manufacturability of the composition, enhance composition aesthetics, or improve a particular functional property or characteristic of the coating composition or the cured composition resulting therefrom, such as adhesion to a substrate. Additives that may be included are carriers, additional polymers, emulsifiers, pigments, metal powders or paste, fillers, anti-migration aids, anti-microbials, extenders, curing agents, lubricants, coalescents, wetting agents, biocides, plasticizers, crosslinking agents, antifoaming agents, colorants, waxes, anti-oxidants, anticorrosion agents, flow control agents, thixotropic agents, dispersants, adhesion promoters, UV stabilizers, scavenger agents or combinations thereof. Each optional ingredient can be included in a sufficient amount to serve its intended purpose, but preferably not in such an amount to adversely affect a coating composition or a cured coating resulting therefrom.

Any suitable carrier may be used to prepare coating compositions of the invention. Suitable carriers include carrier liquids such as organic solvents, water, and mixtures thereof. Suitable organic solvents include aliphatic hydrocarbons (e.g. mineral spirits, kerosene, high flashpoint VM&P naptha, and the like); aromatic hydrocarbons (e.g. benzene, toluene, xylene, solvent naphtha 100, 150, 200 and the like); alcohols (e.g. ethanol. n-propanol, isopropanol, n-butanol, iso-butanol and the like); ketones (e.g. acetone, 2-butanone, cyclohexanone, methyl aryl ketones, ethyl aryl ketones, methyl isoamyl ketones, and the like); esters (e.g. ethyl acetate, butyl acetate and the like); glycols (e.g. butyl glycol), glycol ethers (e.g. ethylene glycol monomethyl ether, ethylene glycol monoethyl ether, ethylene glycol monobutyl ether, propylene glycol monomethyl ether, and the like); glycol esters (e.g. butyl glycol acetate, methoxypropyl acetate and the like); and mixtures thereof. Preferably, the liquid carrier(s) are selected to provide a dispersion or solution of the polyester polymer of the invention for further formulation.

In some embodiments, the coating composition of the invention is a water-based varnish. In some such embodiments, preferably at least about 50 wt-% of the liquid carrier system is water, more preferably about 60 wt-% is water, and even more preferably about 75 wt-% is water. Certain coating compositions of the invention include at least about 10 wt-% of water, more preferably at least about 20 wt-% of water, and even more preferably at least about 40 wt-% of water (in some embodiments about 50 wt-% or more of water), based on the total weight of the coating composition.

Coating compositions of the invention may be prepared by conventional methods in various ways. For example, the coating compositions may be prepared by simply admixing the phenolic-functional polyester polymer, optional crosslinker and any other optional ingredients, in any desired order, with sufficient agitation. The resulting mixture may be admixed until all the composition ingredients are substantially homogeneously blended. Alternatively, the coating compositions may be prepared as a liquid solution or dispersion by admixing an optional carrier liquid, the phenolic-functional polyester polymer, optional crosslinker, and any other optional ingredients, in any desired order, with sufficient agitation. An additional amount of carrier liquid may be added to the coating compositions to adjust the amount of nonvolatile material in the coating composition to a desired level.

The total amount of solids present in coating compositions of the invention may vary depending upon a variety of factors including, for example, the desired method of application. Presently preferred coating compositions include at least about 30, more preferably at least about 35, and even more preferably at least about 40 wt-% of solids, based on the total weight of the coating composition. Preferably, the coating compositions include less than about 80, more preferably less than about 70, and even more preferably less than about 65 wt-% of solids, based on the total weight of the coating composition.

In another embodiment, the invention provides a coating composition that includes the phenolic-functional polyester polymer of the invention in combination with an optional thermoplastic dispersion and optional crosslinker. Such coating compositions may be suitable for various applications such as, for example, food or beverage packaging applications. While not intending to be bound by any theory, it is believed that certain phenolic-functional polyester polymers of the invention are capable of stabilizing certain thermoplastic materials such as, for example, poly vinyl chloride ("PVC") to prevent or decrease degradation of the thermoplastic material or a cured coating resulting therefrom. Thus, it is within the scope of this invention to include an efficacious amount of the polyester polymer of the invention (e.g., for purposes of stabilizing the thermoplastic dispersion) in an organosol or plastisol coating composition. Organosols useful in the compositions of the invention, include, for example, vinyl organosols. A "vinyl organosol," as used herein, is a dispersion of vinyl chloride polymers (preferably high-molecular-weight vinyl chloride polymers) in a liquid carrier. A discussion of suitable materials and preparation methods for such compositions may be found, for example, in U.S. Pat. App. No. PCT/US2008/058899.

Organosol coating compositions of the invention preferably include at least about 10, more preferably at least about 15, and even more preferably at least about 20 wt-% of phenolic-functional polyester polymer of the invention, based on the total nonvolatile weight of the coating composition. The organosol coating compositions preferably include less than about 90, more preferably less than about 70, and even more preferably less than about 60 wt-% of phenolic-functional polyester polymer, based on the total nonvolatile weight of the coating composition.

Organosol coating compositions of the invention preferably include at least about 10, more preferably at least about 15, and even more preferably at least about 20 wt-% of thermoplastic material, based on the total nonvolatile weight of the coating composition. The organosol coating compositions preferably include less than about 80, more preferably less than about 70, and even more preferably less than about 65 wt-% of thermoplastic material, based on the total nonvolatile weight of the coating composition.

When present in an organosol composition of the present invention, the concentration of one or more optional crosslinkers may vary depending upon the desired result. For example, in some embodiments, the coating composition may contain one or more crosslinkers in an amount of preferably at least about 0.5, more preferably at least about 1, and even more preferably at least about 1.5 wt-%, by weight of nonvolatile material in the coating composition. The amount of one or more optional crosslinkers included in the coating composition is preferably less than about 15, more preferably less than about 4.5, and even more preferably less than about 2 wt-%, by weight of nonvolatile material in the coating composition.

Examples of suitable thermoplastic materials include halogenated polyolefins, which include, for example, copolymers and homopolymers of vinyl chloride, vinylidenefluoride, polychloroprene, polychloroisoprene, polychlorobutylene, and combinations thereof. PVC is a particularly preferred thermoplastic material. The thermoplastic material preferably has a number average molecular weight (Mn) of from about 40,000 to about 300,000; more preferably from about 75,000 to about 200,000; and even more preferably from about 100,000 to about 150,000.

In applications involving packaging coatings, dispersion grade thermoplastic particles are preferred, where the particles range in size from greater than 0 to about 5 microns, based on volume-average median particle diameter. Other sizes, however, can be used such as, for example, nondispersion grade thermoplastic particles that range in size from about 5 to about 100 microns, based on volume-average median particle diameter.

The thermoplastic material is preferably dispersed in a liquid carrier to form a thermoplastic dispersion. Examples of suitable liquid carriers include an organic solvent, a plasticizer, or mixtures thereof. Suitable organic solvents may include polar solvents such as ketones (e.g., MIBK and DIBK), glycol ethers, alcohols, aliphatic hydrocarbons, aromatic hydrocarbons, or mixtures thereof. In some embodiments, it may be advantageous to choose a solvent that has an affinity to the thermoplastic material and/or one that can swell the thermoplastic particles to facilitate storage stability of the liquid coating composition. Preferred liquid carriers exhibit sufficient volatility to substantially evaporate from the coating composition during the curing process.

Cured coatings of the invention preferably adhere well to metal (e.g., steel, tin-free steel (TFS), tin plate, electrolytic tin plate (ETP), aluminum, etc.) and provide high levels of resistance to corrosion or degradation that may be caused by prolonged exposure to products such as food or beverage products. The coatings may be applied to any suitable surface, including inside surfaces of containers, outside surfaces of containers, container ends, and combinations thereof.

The coating composition of the invention can be applied to a substrate using any suitable procedure such as spray coating, roll coating, coil coating, curtain coating, immersion coating, meniscus coating, kiss coating, blade coating, knife coating, dip coating, slot coating, slide coating, and the like, as well as other types of premetered coating. In one embodiment where the coating is used to coat metal sheets or coils, the coating can be applied by roll coating.

The coating composition can be applied on a substrate prior to, or after, forming the substrate into an article. In some embodiments, at least a portion of a planar substrate is coated with one or more layers of the coating composition of the invention, which is then cured before the substrate is formed into an article.

After applying the coating composition onto a substrate, the composition can be cured using a variety of processes, including, for example, oven baking by either conventional or convectional methods. The curing process may be performed in either discrete or combined steps. For example, the coated substrate can be dried at ambient temperature to leave the coating composition in a largely un-crosslinked state. The coated substrate can then be heated to fully cure the coating composition. In certain instances, the coating composition can be dried and cured in one step. In preferred embodiments, the coating composition of the invention is a heat-curable coating composition.

The curing process may be performed at any suitable temperature, including, for example, temperatures in the range of about 180° C. to about 250° C. If metal coil is the substrate to be coated, curing of the applied coating composition may be conducted, for example, by subjecting the coated metal to a temperature of about 230° C. to about 250° C. for about 15 to 30 seconds. If metal sheeting is the substrate to be coated (e.g., such as used to make three-piece food cans), curing of the applied coating composition may be conducted, for example, by subjecting the coated metal to a temperature of about 190° C. to about 210° C. for about 8 to about 12 minutes.

Coating compositions of the invention may be useful in a variety of coating applications. The coating compositions are particularly useful as adherent coatings on interior or exterior surfaces of metal containers. Examples of such articles include closures (including, e.g., internal surfaces of twist off caps for food and beverage containers); internal crowns; two- and three-piece cans (including, e.g., food and beverage containers); shallow drawn cans; deep drawn cans (including, e.g., multi-stage draw and redraw food cans); can ends (including, e.g., easy open can ends); monobloc aerosol containers; and general industrial containers, cans, and can ends.

Preferred coating compositions of the invention are particularly suited for use on interior or exterior surfaces of metal food or beverage containers, including food-contact surfaces. Preferably, the cured coatings are retortable when employed in food and beverage container applications. Preferred cured coatings of the invention are capable of withstanding elevated temperature conditions frequently associated with retort processes or other food or beverage preservation or sterilization processes. Particularly preferred cured coatings exhibit enhanced resistance to such conditions while in contact with food or beverage products that exhibit one or more aggressive (or corrosive) chemical properties under such conditions. Examples of such aggressive food or beverage products may include meat-based products, milk-based products, fruit-based products, energy drinks, and acidic or acidified products.

The coating composition of the invention is particularly suitable for use as a coating on the food-contact surface of the sidewall of a three-piece food can. The coating composition is typically applied to a metal sheet which is then typically cured prior to fabricating the coated sheet into the sidewall of a three-piece food can.

Test Methods

Unless indicated otherwise, the following test methods were utilized in the Examples that follow.

A. Solvent Resistance Test

The extent of "cure" or crosslinking of a coating is measured as a resistance to solvents, such as methyl ethyl ketone (MEK) or isopropyl alcohol (IPA). This test is performed as described in ASTM D 5402-93. The number of double rubs (i.e., one back-and-forth motion) is reported. Preferably, the MEK solvent resistance is at least 30 double rubs. The results of this test for coatings prepared according to the present invention are presented in Tables 4, 7 and 8.

B. Adhesion Test

Adhesion testing was performed to assess whether the coating compositions adhere to the coated substrate. The Adhesion Test was performed according to ASTM D 3359—Test Method B, using SCOTCH 610 tape, available from 3M Company of Saint Paul, Minn. Adhesion is generally rated on a scale of 0-10 where a rating of "10" indicates no adhesion failure, a rating of "9" indicates 90% of the coating remains adhered, a rating of "8" indicates 80% of the coating remains adhered, and so on. A coating is considered herein to satisfy the Adhesion Test if it exhibits an adhesion rating of at least 8. The results of this test for coatings prepared according to the present invention (after retort pursuant to the Retort Method) are presented in Tables 4 and 7.

C. Blush Resistance Test

Blush resistance measures the ability of a coating to resist attack by various solutions. Typically, blush is measured by the amount of water absorbed into a coated film. When the film absorbs water, it generally becomes cloudy or looks white. Blush was measured visually using a scale of 0-5 where a rating of "0" indicates no blush, a rating of "1" indicates slight whitening of the film, and a rating of "3" indicates whitening of the film, and so on. Blush ratings of "2" or less are typically desired for commercial packaging coatings and optimally "1" or less. The results of this test for coatings prepared according to the present invention are presented in Tables 4, 7 and 8.

D1. Process or Retort Resistance Test

This is a measure of the coating integrity of the coated substrate after exposure to heat and pressure with a liquid such as water. Retort performance is not necessarily required for all food and beverage coatings, but is desirable for some product types that are packed under retort conditions. The procedure is similar to the Sterilizations or Pasteurization Test. Testing is accomplished by subjecting the substrate to heat ranging from 105-130° C. and pressure ranging from 0.7 kg/cm$^2$ (kilograms per square centimeter) to 1.05 kg/cm$^2$ for a period of 15 to 90 minutes. The coated substrate was then tested for adhesion and blush as described above. In food or beverage applications requiring retort performance, adhesion ratings of 10 and blush ratings of at least 7 are typically desired for commercially viable coatings. The results of this test for coatings prepared according to the present invention are presented in Tables 4, 7 and 8.

D2. Retort Method

This test provides an indication of an ability of a coating to withstand conditions frequently associated with food or beverage preservation or sterilization. For the present evaluation, coated substrate samples (in the form of ETP flat panels) were placed in a vessel and partially immersed in a test substance. While totally immersed in the test substance, the coated substrate samples were placed in an autoclave and subjected to heat of 130° C. and pressure of 1 atm above atmospheric pressure for a time period of 60 minutes. Just after retort, the coated substrate samples were tested for adhesion, blush resistance, and/or stain resistance.

The test substances of Tables 4, 7 and 8 below were prepared using deionized water having the weight percent of the listed material dissolved therein.

E. Wedge Bend Test

This test provides an indication of a level of flexibility of a coating and an extent of cure. For the present evaluation, test wedges were formed from coated rectangular metal test sheets (which measured 12 cm long by 5 cm wide). Test wedges were formed from the coated sheets by folding (i.e., bending) the sheets around a mandrel. To accomplish this, the mandrel was positioned on the coated sheets so that it was oriented parallel to, and equidistant from, the 12 cm edges of the sheets. The resulting test wedges had a 6 mm wedge diameter and a length of 12 cm. To assess the wedge bend properties of the coatings, the test wedges were positioned lengthwise in a metal block of a wedge bend tester and a 2.4 kg weight was dropped onto the test wedges from a height of 60 cm.

The deformed test wedges were then immersed in a copper sulphate test solution (prepared by combining 20 parts of $CuSO_4.5H_2O$, 70 parts of deionized water, and 10 parts of hydrochloric acid (36%)) for about 2 minutes. The exposed metal was examined under a microscope and the millimeters of coating failure along the deformation axis of the test wedges was measured.

The results of this test for coatings prepared according to the present invention are presented in Table 5, with the data expressed as a wedge bend percentage using the following calculation:

$$100\% \times [(120 \text{ mm}) - (\text{mm of failure})]/(120 \text{ mm}).$$

A mono-coat coating system is considered herein to satisfy the Wedge Bend Test if it exhibits a wedge bend percentage of 70% or more.

A coating is considered herein to satisfy the Wedge Bend Test if it exhibits a wedge bend percentage of 70% or more.

EXAMPLES

The invention is illustrated by the following examples. It is to be understood that the particular examples, materials, amounts, and procedures are to be interpreted broadly in accordance with the scope and spirit of the inventions as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Mo.

Examples 1 and 2: Cardanol Adducts

TABLE 1

| | Ingredient | Example 1 (wt-%) | Example 2 (wt-%) |
|---|---|---|---|
| 1 | Cardanol 1500 – 1 | 66.1 | 69.6 |
| 2 | Maleic anhydride | 18.5 | 17.0 |
| 3 | Hydroquinone mono methyl ether | 0.1 | 0.1 |
| 4 | Xylene | 5.2 | 8.1 |
| 5 | Xylene | 6.6 | 5.2 |

Adducts of cardanol and maleic anhydride were produced as follows. The list of ingredients used to produce the adducts of Examples 1 and 2 are provided in Table 1. The cardanol compound (i.e., ingredient 1) was the Cardanol 1500-1 product from Cardolite Corporation. For each of Examples 1 and 2, ingredients 1-4 of Table 1 were combined, and the adducts of cardanol and maleic anhydride were obtained by via an Adler-ene reaction by heating the resulting mixture at 180 to 200° C., under solvent reflux. Formation of the adduct was followed by monitoring the amount of unreacted maleic anhydride using gel permeation chromatography ("GPC") analysis. The reaction was determined to be complete when the wt-% of maleic anhydride was less than 0.5%. The reaction time varied from about 4 to about 10 hours, depending upon the recipe. The resulting mixtures were thinned with ingredient 5. The mixture of Example 1 had a non-volatile content ("NYC") of 88% and a measured acid value of 171. The mixture of Example 2 has a non-volatile content of 87% and a measured acid number of 117.

Examples 3 and 4: Cardanol-Containing, Phenolic-Functional Polyester

TABLE 2

| | Ingredients | Example 3 (wt-%) | Example 4 (wt-%) |
|---|---|---|---|
| 1 | Neopentyl glycol | 28 | 19 |
| 2 | Ethylene glycol | | 3 |
| 3 | 1-4, cyclohexane dimethanol | | 11 |
| 4 | Benzylic alcohol | | 2 |
| 5 | Isophthalic acid | 26 | 20 |
| 6 | Terephthalic acid | | 20 |
| 7 | Cardanol Adduct of Example 1 | 46 | 25 |
| 8 | Dibutyl tin dilaurate (DBTL) | 0.08 | 0.08 |
| | Total reactants, % in weight | 100 | 100 |
| 9 | Xylene | 9.5 | |
| 10 | Solvesso 100 | 9.3 | 19.4 |

In Examples 3 and 4, a phenolic-functional polyester was produced in which pendant phenolic groups were provided through incorporation of a cardanol/maleic anhydride adduct into the backbone of the polyester. The ingredients for producing the phenolic-functional polyesters of Examples 3 and 4 are provided in Table 2. Components 1 to 8 were reacted in a reactor under reflux conditions using components 9 and/or 10. The esterification reaction proceeded under reaction temperatures of about 190 to 210° C. until an acid value of less than 10 was observed. The final acid value for the polyester of Example 3 was 10 and the final acid value of the polyester of Example 4 was 7.

The resulting resin compositions were then thinned using additional organic solvent. After thinning, the resin composition of Example 3 was determined to constitute 70% by weight of nonvolatile material and the resin composition of Example 4 was determined to constitute 57% by weight of nonvolatile material.

Example 5: Methylolated Phenolic-Functional Polyester

Methylol groups were provided on the phenolic-containing groups of the polyester of Example 3 using the following procedure. The ingredients used for the methylolation process to produce the polyester of Example 5 are listed in Table 3. Paraformaldehyde was reacted under basic conditions using the triethylamine (3) with butanol (1) on a molar ratio, at 90° C., during 1 hour after clarification of the medium, to achieve acetal formation. The resulting mixture was then reacted with the polyester of Example 3 in an amount such that the molar ratio of phenolic groups to formaldehyde was about 1 to about 2.6. The pH was adjusted to about 7.5 by adding triethylamine (5) and then butanol (6). The reaction temperature was maintained for about 3 hours at 90° C. to complete methylolation. Then toluene (7) was added and the temperature was progressively increased in order to maintain a continuous reflux. Thanks to a trap the water was eliminated while the solvent was returned to the reactor. The reaction temperature reached about 130 to 140° C. at the end of the process. When the viscosity (measured using the Falling ball method, 25° C.) was about 30-33 Poises, the product was cooled in order to stop the reaction. The resulting product was 58 wt-% NVM (non-volatile material).

TABLE 3

| | Ingredients of Example 5 | Wt-% |
|---|---|---|
| 1 | Butanol | 11 |
| 2 | Paraformaldehyde | 4.5 |
| 3 | Triethylamine | 0.14 |
| 4 | Example 3 polyester at 70% NVM | 73 |
| 5 | Triethylamine | 1 |
| 6 | Butanol | 6.7 |
| 7 | Toluene | 2.5 |

Examples 6-8: Coating Compositions

The resin mixtures of Examples 3 and 5 were formulated into the coating compositions of Example 6, 7, and 8 by combining the resin mixtures as shown in Table 4 with resole phenolic crosslinker resin and catalyst. The resulting varnishes were bar coated at a film weight of 5-7 g/m$^2$ onto ETP 2.8/2.8 sheets (i.e., ETP sheets having a tin weight on each side of the sheet of 2.8 g/m$^2$). The coated sheets were cured for 12 minutes in a 200° C. oven. For sake of comparison, an ETP sheet was also coated and cured in a similar manner with Comparative Example A, which was a conventional solvent-based polyester/phenolic coating composition that was a mixture of a high molecular weight hydroxyl-terminated polyester and phenolic resin, where the polyester did not include phenolic-functional groups.

The cured coated samples were then subjected to a variety of tests to assess the coating performance properties of the cured coatings of Examples 6-8 and Comparative Example A. The results of these tests are provided in the lower half of Table 4.

TABLE 4

| Ingredient (wt-%*) | Example 6 | Example 7 | Example 8 | Comparative Example A |
|---|---|---|---|---|
| Example 3 (70% NVC) | 61.8 | 64.2 | | |
| Example 5 (58% NVC) | | | 66.88 | |
| BAKELITE 6470 resole phenolic crosslinker (72% NVC) | | 15.71 | 13.05 | |
| DUREZ 33160 resole phenolic crosslinker (60% NVC) | 18.12 | | | |
| Phosphoric Acid 85% | 0.12 | 0.12 | 0.12 | |
| Butylglycol | 19.96 | 19.97 | 19.95 | |
| TESTING DAT | | | | |
| Number of MEK double rubs | 50 | 100 | 100 | 100 |
| Wedge bend, % OK | 74% | 66% | 66% | 95% |
| Tap Water Retort** (1 hr at 130° C.) | 0/100% | 0/100% | 0/100% | 0/100% |
| 2% Acetic Acid Retort** (1 hr at 130° C.) | 2/100% | 2/100% | 2/100% | 2/100% |
| 1% Lactic Acid Retort* (1 hr at 130° C.) | 2/100% | 2/100% | 4/0% | 5/0% |

*The wt-% is indicated as a percentage of the total weight of the varnish.
**The retort data is reported as X/Y% where X is the blush on a 0 to 5 scale with 0 being no blush and 5 being extreme blush, and Y is the % adhesion on a 0% to 100% scale with 0% being complete loss of adhesion and 100% being no detectable loss of adhesion.

Example 9: pHPAA-Containing Phenolic-Functional Polyester

Using the methods described below, the phenolic-functional polyester of Example 9 was produced using an adduct of p-hydroxyphenyl acetic acid ("pHPAA") and trimethylol proprane ("TMP") to provide pendant phenolic-containing groups. The adduct was produced using the ingredients listed in Table 5. TMP and pHPAA were reacted on a molar ratio using a classical esterification reaction using DBTL as a catalyst until the acid value was less than 2. The final reaction temperature was about 230° C. The resulting composition was thinned with xylene and Solvesso 100 solvent.

TABLE 5

| | Ingredient | Wt-% |
|---|---|---|
| 1 | Trimethylol propane | 47 |
| 2 | pHydro phenyl acetic acid (pHPAA) | 53 |
| 3 | Dibutyl tin dilaurate (DBTL) | 0.1 |
| | Total reactants, % in weight | 100 |
| 4 | Xylene | 3 |
| 5 | SOLVESSO 100 solvent | 7 |
| | NVM | 90 |
| | Total, % in weight | 100 |

The phenolic-functional polyester of Example 9 was produced using the ingredients listed in Table 6, which include the aforementioned TMP/pHPAA phenol-diol adduct. Incorporation of the phenol-diol adduct into a polyester backbone was accomplished using classical esterification conducted, at reflux temperatures, using ingredient 7. The reaction temperature was between about 220 and about 230° C. The reaction was allowed to continue until the acid value was determined to be less than 10. The resulting resin product was then thinned in ingredients 8 through 11 and after thinning constituted 48.6 wt-% NVM.

TABLE 6

| | Ingredient | Wt-% of total reactants (A2SR1733) |
|---|---|---|
| 1 | Neopentyl glycol | 22.5 |
| 2 | Monoethylene glycol | 4 |
| 3 | Example 9 Phenol-diol adduct | 20 |
| 4 | Isophthalic acid | 26.75 |
| 5 | Terephthalic acid | 26.75 |
| 6 | Dibutyl tin dilaurate (DBTL) | 0.08 |
| | Total reactants; % by weight | 100 |
| 7 | SOLVESSO 100 solvent | 2.5 |
| 8 | Xylene | 11.4 |
| 9 | SOLVESSO 100 solvent | 20.4 |
| 10 | Butyl glycol | 11.4 |
| 11 | Butanol | 5.7 |
| | Total % by weight | 100 |

Examples 10 and 11: Coating Compositions

The phenolic-functional polyester of Example 9 was formulated to produce the coating compositions of Examples 10 and 11. The ingredients for coating compositions 10 and 11 are provided in Table 7. The coating compositions of Examples 10 and 11, as well as Comparative Example A, were applied to ETP substrate using the methods previously described for Examples 6-8. The cured coated samples were subjected to a variety of tests to assess the coating performance properties of the cured coatings of Examples 9 and 10 relative to Comparative Example A. The results of these tests are provided in the lower half of Table 7.

TABLE 7

| Ingredient (wt-%*) | Example 10 | Example 11 | Comparative Example A |
|---|---|---|---|
| Example 9 Resin (48.6% NVC) | 66.44 | 68.37 | |
| DUREZ 33160 resole phenolic (60% NVC) | 13.46 | | |
| BAKELITE 6470 resole phenolic (72% NVC) | | 11.55 | |
| Phosphoric acid 85% | 0.12 | 0.10 | |
| Butyl glycol | 19.98 | 19.98 | |
| Number of MEK double rubs | 95 | 100 | 100 |
| TESTING DATA | | | |
| Wedge bend, % OK | 75% | 63% | 95% |
| TapWater Retort** (1 hour at 130° C.) | 0/100% | 0/100% | 0/100% |
| 2% Acetic Acid Retort** (1 hour at 130° C.) | 1/100% | 3/100% | 2/100% |
| 1% Lactic Acid Retort** (1 hour at 130° C.) | 1/100% | 2/100% | 5/0% |
| 2% NaClRetort** (1 hour at 130° C.) | 1/90% | 1.5/100% | |

*The wt-% is indicated as a percentage of the total weight of the varnish.
**The coating performance data is reported using the same format as that of Table 4.

Examples 12 and 13: Organosol Coating Compositions

The phenolic-functional polyester of Example 9 was formulated to produce the organosol coating compositions of Examples 12 and 13. The ingredients for the organosol coating compositions 12 and 13 are provided in Table 8. The organosol coating is prepared in the following way: A dispersion of the PVC in a mixture of Solvesso 100 solvent and ethyldiglycol ("EDG") was made under high speed stirring for 30 minutes, with the temperature maintained below 30° C. The dispersion gauge was checked with a Hegmann gauge (<6). This dispersion was added under stirring at a temperature of less than 30° C. to a pre-mix of polyester resin, phenolic resin, phosphoric acid, and butylglycol.

The coating compositions of Examples 12 and 13 were applied to ETP substrate using the methods previously described for Examples 6-8. The coated panels were cured for 10 minutes in a 200° C. oven. The cured coated samples were subjected to a variety of tests, which were conducted at least 24 hours after curing, to assess the coating performance properties of the cured coatings of Examples 12 and 13. The results of these tests are provided in the lower half of Table 8.

TABLE 8

| Ingredient (wt-%*) | Example 12 | Example 13 |
|---|---|---|
| Example 9 Resin (48.6% NVC) | 25.37 | 19.40 |
| DUREZ 33160 resole phenolic (60% NVC) | 5.15 | 3.94 |
| Phosphoric acid (85%) | 0.03 | 0.02 |
| Butyl glycol | 7.94 | 6.08 |
| GEON 178 PVC | 30.75 | 35.28 |
| Solvesso 100 | 15.38 | 17.64 |
| EDG | 15.38 | 17.64 |
| TESTING DATA | | |
| Number of MEK double rubs | 95 | 95 |
| Wedge bend, % OK | 87% | 85% |
| TapWater Retort** (1 hour at 130° C.) | 2/100% | 2/100% |
| 2% Acetic Acid Retort** (1 hour at 130° C.) | 2/100% | 2/100% |
| 1% Lactic Acid Retort** (1 hour at 130° C.) | 2/100% | 2/100% |
| 2% NaCl Retort** (1 hour at 130° C.) | 3/100% | 3/100% |

*The wt-% is indicated as a percentage of the total weight of the varnish.
**The coating performance data is reported using the same format as that of Table 4.

Example 14: Diphenolic-Acid-Containing, Phenolic-Functional Polyester

Using the methods described below, a phenolic-functional polyester was produced using diphenolic acid.

An adduct was first prepared as follows between 1.0 mole of trimethylol propane and 1.01 mole of diphenolic acid (4,4-Bis (4-hydroxyphenyl)valeric acid). To a 4-neck round-bottom flask equipped with a mechanical stirrer, a Dean-Starke trap, a condenser, a thermocouple connected to a temperature control device, and an inlet for a nitrogen blanket, was added 1,024.8 parts of diphenolic acid, 475.2 parts of trimethylol propane, and 1.5 parts of Fastcat 4201 (dibutyltin oxide). This mixture was heated slowly to 210° C. over the course of 300 minutes. After heating another 120 minutes, the batch had an acid number of 0.9 and a hydroxyl number of 535. The mixture was cooled to 160° C. and discharged. The solid material was broken up into small pieces for use in the next reaction.

The phenolic-functional polyester of Example 14 was produced using the above diphenolic acid adduct as follows. To a 4 neck round-bottom flask equipped with a mechanical stirrer, a packed column, Dean-Starke trap, a condenser, a thermocouple connected to a temperature control device, and an inlet for a nitrogen blanket, was added 98.5 parts of neopentyl glycol, 17.5 parts of ethylene glycol, 115 parts of terphthalic acid, and 0.5 parts of Fastcat 4201 (dibutyltin oxide). This mixture was heated to 220° C. over the course of 60 minutes. After heating another 120 minutes, the batch had an acid number of 0.0 and a hydroxyl number of 246. The mixture was cooled to 160° C. 9 parts of neopentyl glycol, 115 parts of isophthalic acid, 18.5 parts of dimer fatty acid (Radiacid 960), and 135.5 parts of the above diphenolic acid adduct were added to the reaction mixture. The batch was heated to 220° C. over the course of 90 minutes. After heating an additional 120 minutes, the batch had become clear and had an acid number of 34.5. The batch was cooled to 150° C. and the packed column was removed. 25 parts of xylene were added, and the batch was set up for reflux and heated to 205° C. and held for 210 minutes until an acid number of 2.0 was reached. The batch was then cooled to 180° C. at which time a mixture of 170 parts of Aromatic 100 solvent and 75 parts of xylene was added. When this addition was complete and the batch was no higher than 150° C., a mixture of 65 parts butylcellosolve and 45 parts dibasic ester was added. The batch was mixed until uniform and the batch was discharged. The percent solids of the composition were 54.0%.

Example 15: Coating Composition

A finish was made from 100 parts of the phenolic-functional polyester prepared in Example 14, 19.3 parts of BKS 7590 thermosetting phenolic (commercially available from Georgia Pacific), and 0.73 parts of a 10% $H_3PO_4$ solution in butanol. This finish was applied to tin free steel and tinplate and baked 10 minutes in a 400° F. (204° C.) oven to obtain a dry film thickness of 4.0-5.0 milligrams/square inch. The same was done with a leading commercial solvent-based epoxy phenolic coating composition (hereinafter Comparative Example B) in the metal food packing industry. 202 can ends were fabricated from these panels, and the center of the can end was subjected to a 14 inch-pound reverse impact. These ends were sealed in cans that were hot filled at 180° F. (82° C.) with sauerkraut and ketchup (separately). The cans were put in a 120° F. (49° C.) hot room for 2 weeks. At this time the cans were opened and the can ends were evaluated for the performance of the coating. The results are shown in Table 9. It can be seen from Table 9 that the coating from Example 3 is equivalent in performance to the industry standard epoxy coating.

TABLE 9

| | | ETP Substrate | | TFS Substrate | |
|---|---|---|---|---|---|
| Packed Product | Test | Comparative Example B | Example 15 | Comparative Example B | Example 15 |
| Ketchup | Adhesion/Blush | 10/10 | 9/10 | 10/10 | 10/10 |
| | Stain/Corrosion | 10/10 | 10/10 | 10/10 | 10/9 |
| Sauerkraut | Adhesion/Blush | 10/10 | 10/10 | 10/10 | 10/10 |
| | Stain/Corrosion | 8/9 | 9/9 | 10/9 | 10/10* |

*Slight countersink splitting was observed.

Example 16: Water-Dispersible Phenolic-Functional Polyester

A water-dispersible phenolic-functional polyester was produced as described below. A phenolic-functional polyester was first produced from the ingredients listed below in Table 10 using the methods of Examples 3 and 4. The resulting polyester had a viscosity of 44 Poises (Noury, 25° C.), an acid value of 2.6, and an NVC of 62% (theoretical value).

TABLE 10

| Ingredient | Amount (Weight Parts) |
| --- | --- |
| Neopentylglycol | 281.4 |
| Ethylene glycol | 83.4 |
| Cyclohexane dimethanol | 472 |
| Isophthalic acid | 325.2 |
| Terephthalic acid | 325.2 |
| Cyclohexane dicarboxylic acid | 240.2 |
| Adduct 2 (see Ex 2, Table 1) | 672.6 |
| Dibutyl tin dilaurate (DBTL) | 2.4 |
| Xylene | 140.2 |
| Butylglycol | 1206.7 |

To render the phenolic-functional polyester water dispersible, it was reacted with an acrylic monomer mixture containing acid-functional monomers. The resulting copolymer was then reacted with an amine and diluted with water to form an aqueous dispersion of the copolymer. The ingredients used in this reaction are listed below in Table 11.

TABLE 11

| | Ingredient | Amount (Weight Parts) |
| --- | --- | --- |
| 1 | Phenolic-Functional Polyester of Table 10 | 600 |
| 2 | Butanol | 41.4 |
| 3 | Styrene | 23.8 |
| 4 | Ethyle acrylate | 7.93 |
| 5 | Butyl methacrylate | 10.58 |
| 6 | Acrylic acid | 13.93 |
| 7 | Methyacrylic acid | 33.29 |
| 8 | Benzoyl peroxide | 3.38 |
| 9 | Di (t amylperoxy) cyclohexane | 1.68 |
| 10 | Di (t amylperoxy) cyclohexane | 1.68 |
| 11 | Dimethylethanolamine | 51.7 |
| 12 | Water | 51.7 |
| 13 | Water | 490.6 |
| 14 | Water | 694.7 |

Components 1 and 2 were placed into a round-bottom flask equipped with a total condenser and a stirrer. Under nitrogen bubbling, the mixture is heated at 120 to 122° C. Then a premix of components 2 through 8 is added at 120 to 122° C. over 90 minutes. After 30 minutes, component 9 was added and 1 hour later component 10 was added. The product was kept for an additional hour at 120 to 122° C. and then cooled down to 100 to 105° C. At 100 to 105° C., a premix of components 11 and 12 was added over 10 minutes under agitation. Over 30 minutes, component 13 was added and the temperature naturally decreased to 80 to 85° C. Component 14 was added over 30 minutes under agitation. The resulting polyester-acrylate copolymer mixture had a Noury viscosity (25° C., Afnor 4) of 31 seconds, a pH of 8.78, an NVC of 23% (theoretical), and a volume average particle size of 0.35 microns.

Example 17: Water-Based Coating Compositions

The water-based coating composition of Example 17 was produced from the aqueous dispersion of Example 16 and included about 80% by weight solids of the aqueous dispersion of Example 16, about 20% by weight solids of DUREZ 33160 phenolic resin, and 0.15% by weight of a NACURE 5925 catalyst solution at 20% in butanol. The coating composition was prepared by mixing the aforementioned ingredients at a temperature of less than 35° C. over 30 minutes. If necessary, the viscosity was adjusted with water to achieve a viscosity of between 60 and 75 seconds as determined by a #4 Ford Cup at 20° C.

After a minimum of 24 hours, the coating composition was applied on ETP 2.8/2.8 sheets at a dry film weight of about 5-6 g/m² (grams per square meter) and cured for 10 minutes in a 200-205° C. oven. The cured coating of Example 17 showed excellent adhesion to the ETP substrate. Table 12 below includes the results of various coating property tests that were conducted on the cured coating samples of Example 17. The evaluation was conducted in comparison with an epoxy phenolic coated and cured in similar conditions ("Comparative Example C").

TABLE 12

| | Coating Property Test | | | |
| --- | --- | --- | --- | --- |
| | Solvent | Blush after Retort (1 hour at 130° C.) | | |
| Coating | Resistance (# of double rubs) | Wedge-bend (% OK) | Water | 2% Acetic Acid | 3% Lactic Acid |
| Example 17 | 80 | 71% | 0 | 1 (slight micro blistering; excellent adhesion) | 3 (slight micro blistering; very good adhesion) |
| Comparative* Example C | 100 | 81% | 0 | 3 (slight micro blistering; acceptable adhesion) | 3 (slight micro blistering; no adhesion) |

*Comparative Example C is a commercial water-based epoxy coating for food packaging containers.

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A food or beverage can, or portion thereof, comprising:
a metal substrate forming a body portion or an end portion of a food or beverage can;
a cured coating present on the body portion or the end portion of the metal substrate, the cured coating prepared from a liquid coating composition including a water-dispersible polyester-acrylic copolymer obtained by grafting acid-functional ethylenically unsaturated reactants to a polyester polymer backbone;
the polyester polymer backbone being formed from reactants that include one or more polycarboxylic acid reactants and one or more polyol reactants and wherein the reactants include an unsaturated reactant having a reactive group capable of participating in a step-growth reaction;
wherein the acid-functional ethylenically unsaturated reactants are grafted to the unsaturated reactant having a reactive group capable of participating in a step-growth reaction; and wherein the unsaturated reactant having a reactive group capable of participating in a step-growth reaction includes maleic acid, fumaric acid, tetrahydrophthalic acid, methyltetrahydrophthalic acid, anhydride derivatives thereof, or combinations thereof.

2. The food or beverage of claim 1, wherein the polyester polymer backbone is formed from reactants including, based on resin solids, up to about 30 weight percent of the unsaturated reactant having a reactive group capable of participating in a step-growth reaction.

3. The food or beverage can of claim 1, wherein the one or more polycarboxylic acid reactants include succinic acid, adipic acid, phthalic acid, hexahydrophthalic acid, methylhexahydrophthalic acid, endomethylenetetrahydrophthalic acid, azelaic acid, sebacic acid, tetrahydrophthalic acid, isophthalic acid, trimellitic acid, terephthalic acid, a naphthalene dicarboxylic acid, cyclohexane-dicarboxylic acid, glutaric acid, anhydrides or derivatives thereof, and mixtures thereof.

4. The food or beverage can of claim 3, wherein the polyester polymer backbone is formed from reactants including, based on total resin solids, less than about 80 weight percent of the one or more polycarboxylic acids.

5. The food or beverage can of claim 1, wherein the one or more polyol reactants include ethylene glycol, propylene glycol, 1,3-propanediol, glycerol, diethylene glycol, dipropylene glycol, triethylene glycol, trimethylolpropane, trimethylolethane, tripropylene glycol, neopentyl glycol, pentaerythritol, 1,4-butanediol, hexylene glycol, cyclohexane dimethanol, a polyethylene or polypropylene glycol, isopropylidene bis (p-phenylene-oxypropanol-2), and mixtures thereof.

6. The food or beverage can of claim 5, wherein the polyester polymer backbone is formed from reactants including, based on resin solids, at least about 20 weight percent of the one or more polyol reactants.

7. The food or beverage can of claim 1, wherein the reactants includes cyclohexane dimethanol, isophthalic acid, and maleic anhydride.

8. The food or beverage can of claim 1, wherein the polyester acrylic copolymer has a hydroxyl value of about 10 to about 150 mg KOH/gram.

9. The food or beverage of claim 1, wherein the polyester acrylic copolymer has an acid value less than about 20 mg KOH/gram.

10. The food or beverage can of claim 7, wherein the acid-functional ethylenically unsaturated monomers include ethylenically unsaturated mono- or multi-functional acids(s) selected from (meth)acrylic acid; (meth)acrylates; vinylsulfonic acid; crotonic acid; alpha,beta-ethylenically unsaturated carboxylic acids, maleic acid, 2-methyl maleic acid, fumaric acid, itaconic acid, and 2-methyl itaconic acid; alpha-chloroacrylic acid; alpha-cyano acrylic acid; alpha-phenylacrylic acid; beta-stearylacrylic acid; sorbic acid; alpha-chlorosorbic acid; angelic acid; cinnamic acid; p-chlorocinnamic acid; citraconic acid; mesaconic acid; aconitic acid; derivatives thereof, anhydrides thereof, or any combination thereof.

11. The food or beverage can of claim 10, wherein the polyester acrylic copolymer is obtained from reactants including up to about 40 weight percent of the acid-functional ethylenically unsaturated monomers based on the total weight of reactants allowed to react with the polyester polymer backbone.

12. The food or beverage can of claim 1, wherein the polyester-acrylic copolymer is present in the coating composition in an amount greater than about 50 weight percent based on the total nonvolatile weight of the coating composition.

13. The food or beverage can of claim 1, wherein the one or more polycarboxylic acid reactants include isophthalic acid, hexahydrophthalic acid, anhydride derivatives thereof, or combinations thereof and wherein the one or more polyol reactants include cyclohexane dimethanol, trimethylol propane, propane diol, derivatives thereof, or combinations thereof.

14. The food or beverage can of claim 13, wherein the acid-functional ethylenically unsaturated reactants include (meth)acrylic acid, alkyl (meth)acrylates, hydroxyalkyl (meth)acrylates, derivatives thereof, and combinations thereof.

15. The food or beverage of claim 1, wherein at least a portion of acid-functional groups on the acid-functional ethylenically unsaturated reactants are neutralized with a base.

16. The food or beverage can of claim 15, wherein the base includes a tertiary amine.

17. The food or beverage can of claim 1, wherein the cured coating is an inside spray composition for the food or beverage can.

18. The food or beverage can of claim 1, wherein the composition is substantially free of bisphenol A (BPA) and aromatic glycidyl ether compounds.

19. The food or beverage can of claim 1, further comprising a crosslinker selected from a resole-type phenolic crosslinker, an aminoplast crosslinker, a benzoguanamine-formaldehyde-based crosslinker, or combinations thereof.

* * * * *